United States Patent [19]
Baker et al.

[11] Patent Number: 5,124,374
[45] Date of Patent: Jun. 23, 1992

[54] TEMPERATURE RESISTANT STRUCTURAL COMPOSITE

[76] Inventors: Anna L. Baker; David G. Jensen; Brad L. Kirkwood, all of Boeing Aerospace Co., P.O. Box 3999, MS 73-09, Seattle, Wash. 98124-2499

[21] Appl. No.: 159,200

[22] Filed: Feb. 22, 1988

[51] Int. Cl.$^5$ ............................................... B32B 9/00
[52] U.S. Cl. ................................................... 428/391
[58] Field of Search ............... 428/698, 699, 375, 379, 428/391, 384, 392; 501/95; 523/212, 213; 106/499

[56] References Cited

U.S. PATENT DOCUMENTS 4,839,402  6/1989  Stevens ................................ 428/376

Primary Examiner—George F. Lesmes
Assistant Examiner—J. M. Gray

[57] ABSTRACT

A high temperature resistant structural composite composed of ceramic fibers and an organic resin is disclosed in which improved structural performance is obtained through modification of the surface of the ceramic fibers to improve the fiber to resin bond. The ceramic fibers are coated with silanol groups that re-establish hydroxyl sites to enable a difunctional organic coupling agent to bond a resin to the ceramic fibers more effectively.

22 Claims, 3 Drawing Sheets

TEMPERATURE RESISTANT STRUCTURAL COMPOSITE

TECHNICAL FIELD

The present invention generally pertains to coated ceramic fibers, to a temperature resistant composite matrix using the fiber, and to methods of their manufacture.

BACKGROUND INFORMATION

Conventional glass fiber matrix composites have an excellent strength-to-weight ration and are resistant to heat at moderate temperature levels; however, they are unsuited for applications where they may be exposed to flame or high temperature, because the conventional composites are not flame resistant, and because both the glass fibers and the resin lose structural integrity at high temperatures. In addition, the resins commonly used in conventional composites emit toxic gases as they are heated. For this reason, conventional glass fiber composites are unsuitable for constructing fire walls, jet engine duct liners, and other structures that may likely be exposed to flame or high temperatures.

Temperature resistant fibers, such as aluminoborosilicate fibers (sold by Minnesota Mining and Manufacturing Company under the trademark NEXTEL), are available for use in manufacturing temperature resistant composites. A bonding problem exists, however, between the NEXTEL fibers and the high temperature resins, which must be used in temperature resistant composites. Prior to use in the composite, the NEXTEL is heated to remove sizing applied during its manufacture, and then is fired at a temperature in excess of 900° C., increasing the fibers' tensile modulus significantly. The heat treatment removes the hydroxyl groups (normally found on the surface of the fibers) that are important for bonding an organic resin to the fibers. If the resin is applied to these hydroxyl-deficient fibers, the resulting composites are low in strength and flexural modulus, particularly at elevated temperatures. If the resin were more securely bound to the fibers, the strength and modulus could be substantially improved. Other types of ceramic fibers also exhibit the lack of bonding sites (i.e., hydroxyl groups) necessary to prepare high temperature composites of acceptable strength.

While several solutions are plausible to overcome the lack of binding sites, none are particularly desirable. For example, others have sought to etch NEXTEL with organic or inorganic caustics or with inorganic acids, such as HF or $H_2NO_3$, and to use these etched fibers with or without coupling agents in composites—all without significant improvement over use of the untreated fibers alone.

Ceramic fiber composites may serve as lightweight replacements for metal structures, if they can be fabricated to have acceptable strength. The present invention proposes one way of improving the bonding of the resin to the ceramic fibers which overcomes the bonding site deficiency previously encountered when fabricating these types of composites.

Accordingly, this invention provides an improved bond between a ceramic fiber and an organic resin applied to the fiber to form a composite. This advantage and others will be apparent from the attached drawings and the description of the preferred embodiments that follows.

SUMMARY OF THE INVENTION

The present invention is directed to ceramic fiber reinforced organic resin composites including coated ceramic fibers. The coating provides hydroxyl groups on the surface of the fibers that are required to bond the fibers adequately to a polymeric (organic) resin. The fibers are generally coated with a silanol and a difunctional organic coupling agent. The silanol provides hydroxyl groups on the fiber and the coupling agent connects the hydroxyl binding sites of the silanol-coated fiber to the resin. The coupling agent according includes binding sites that preferentially attach at one end to the silanol hydroxyls and at the other end to the resin. After the silanol and coupling agent have been applied, the ceramic fibers are prepregged with the polymeric resin.

The silanol generally is applied as a sol-gel of hydrated tetraethyl-o-silicate (TEOS), application of the sol-gel providing an amorphous silanol layer on the surface of the ceramic fibers. A preferred coupling agent is an aminoalkylsilane, such as $\gamma$-aminopropyltriethoxysilane. The resulting ceramic fiber reforced organic resin composites possess improved flexural modulus and yield strength because of the improved bonding between the ceramic fibers and the polymeric resin provided by the coupling agent and silanol. In this regard, the present invention is directed to a composite comprising silanol-coated fibers, a coupling agent bound to the silanol-coating, and an organic resin bound to the coupling agent. The present invention is also directed to composites having high flexural modulus comprising a ceramic reinforcement, a coating on the reinforcement for providing binding sites on a surface of the ceramic, a coupling agent bound to the binding sites for providing resin couples, and an organic resin bound to the resin couples of the coupling agent.

DISCLOSURE OF THE PREFERRED EMBODIMENTS

Figure 1:
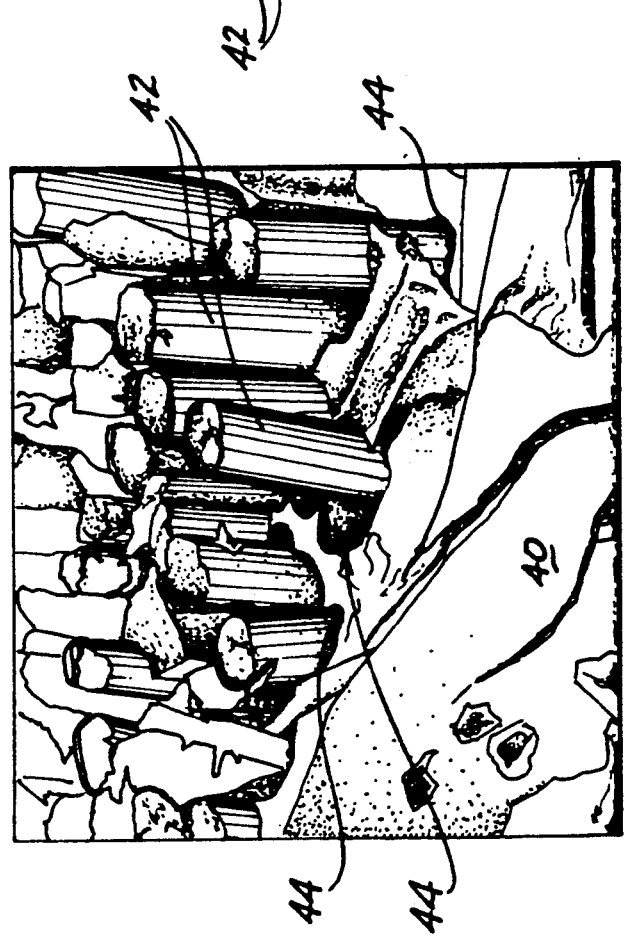
FIG. 1 is a drawing of a photomicrograph made at a magnification factor of 700×, showing a flex beam failure in a polymeric resin/ceramic fiber composite of the prior art.

Prior art composites of ceramic fibers and resins exhibit inadequate strength and flexural modulus for many structural applications, presumably because of an inadequate bond between the ceramic and the resin. As a result, the ceramic fiber reinforced organic resin composites formed according to conventional techniques have a reduced bond strength at the resin/fiber interface and may result in stress-induced voids between the ceramic fibers and the resin that reduce the flexural strength and flexural modulus of the composite. In FIG. 1, a drawing of a photomicrograph (made at a magnification factor of 700×) shows a flex beam failure surface of a prior art composite consisting of untreated NEXTEL fibers and PMR-15 polyimide resin. The flex beam was made according to generally conventional techniques for prepregging, laying-up and curing PMR-15 resin/woven glass fiber sheets. Voids in the resin around each of the NEXTEL fibers are apparent in the photomicrograph. These voids are apparently caused by the failure of the resin to bond to the NEXTEL fibers.

For purposes of this disclosure, the terms "ceramic" and "ceramic fiber(s)" include a broad range of nonmetallic refractory materials, which are represented by an aluminoborosilicate sold under the trademark NEXTEL. During its manufacture and/or prior to its use, NEXTEL is heated to obtain a microcrystalline structure, to remove sizing, and to increase the tensile modulus. The heat treatment, however, eliminates hydroxyl groups that might serve to bind to an organic resin. In the present invention, a coating of a sol-gel, i.e., a solution of ceramic elements in an alcohol or water solvent, is applied to the ceramic substrate. Evaporation of the solvent leaves behind a thin film of silanol groups on the surface of the ceramic substrate. The silanol groups (Si—OH) provide hydroxyl groups for bonding to a coupling agent that is then applied to the silanol coated ceramic substrate. The coupling agent comprises a difunctional molecule, the term "difunctional" referring to the two binding sites provided on the molecule—one a ceramic-philic and the other a resin-philic binding site. The ceramic-philic binding sites of the coupling agent bond to the hydroxyl groups of the silanol. The resin-philic binding sites apparently provide a hydrogen bond link to an organic resin applied to produce the composite. The organic resin is thus bonded to the ceramic substrate through the silanol and the coupling agent, substantially increasing the bond strength at the resin/fiber interface, and eliminating stress-induced voids that otherwise occur between the bare ceramic and the resin.

The ceramic substrate may consist of chopped fibers, whiskers, woven cloth, tape, or continuous fibers. In a preferred embodiment, the sol-gel comprises a dilute hydrolyzed solution of alkylsilicate, such as tetraethyl-o-silicate sprayed onto the fiber. The water and ethyl alcohol solvent comprising the sol-gel evaporates, leaving behind the active Si—OH binding sites. The coupling agent used is an aminoalkylsilane, generally $\gamma$-aminopropyltriethoxysilane. The amine in the coupling agent is believed to hydrogen bond to the resin. Imide, oxazole, thiazole, and imidazole resins, as well as resins comprising mixtures thereof, may be used in accordance with the present invention. A polyimide resin is generally used.

The method used to make the composite according to the present invention is set forth in greater detail in the following Examples.

EXAMPLE 1

Panels were made using a woven NEXTEL 312 ceramic cloth having a five harness satin weave, supplied by 3M Company. Sizing on the commercial cloth was removed by heating the cloth in air under forced convection at a temperature of 480° C. for a period of 4 hours. Other time/temperature cycles are suitable for removal of the sizing. At all times after the sizing was removed from the cloth, care was exercised to minimize damage to the unprotected fibers by abrasion with neighboring fibers. The mechanical characteristics (microstructure and tensile modulus) of the NEXTEL 312 fiber were further improved by placing the cloth in a preheated air circulating furnace at a temperature of approximately 980° C. for one hour.

After cooling, the cloth was suspended in a spray booth for application of a sol-gel of hydrolyzed silicate solution to introduce free hydroxyl groups on the surface of the fibers. The solution applied to the ceramic fiber cloth comprised 2% hydrolyzed tetraethyl-o-silicate (TEOS) dissolved in ethanol, resulting in a solution having 0.75% by weight solids. The ceramic fiber fabric was coated with a thin film of the hydrolyzed silicate solution in a first pass applied with a Preval spray gun and a second pass applied at a right angle to the first. If applied in a layer that is too thick, the coating is likely to flake off, preventing proper filling and bonding of the fibers to the resin. The coated ceramic fiber cloth was air dried for at least eight hours, to form a thin coating of silanol groups on the fibers.

An aminoalkylsilane was then applied as a coupling agent with a solution consisting of:

| Ingredient | Weight Percent |
|---|---|
| A-1100 | 2.5% |
| Deionized Water | 10.0% |
| Ethanol | 87.5% |

The active ingredient in A-1100 is $\gamma$-aminopropyltriethoxysilane. The Preval sprayer was used for applying the coupling agent with a first pass applied in one direction, and a second pass applied at 90 degrees to the first. The coated ceramic fiber cloth was dried at room temperature for at least eight hours prior to further drying for one hour in a preheated air circulating oven at approximately 120° C.

The fabric to be impregnated with resin solution was weighed and the weight of polymeric resin necessary to achieve a 40 weight percent resin panel was determined. (Due to resin bleed during curing, a 40% resin content prepreg results in a desired panel resin content of approximately 25 to 30 percent-by-weight after curing.) In the preferred embodiment, a polyimide (PMR-15 resin varnish) was impregnated into each sheet of the ceramic fiber cloth.

Figure 4:
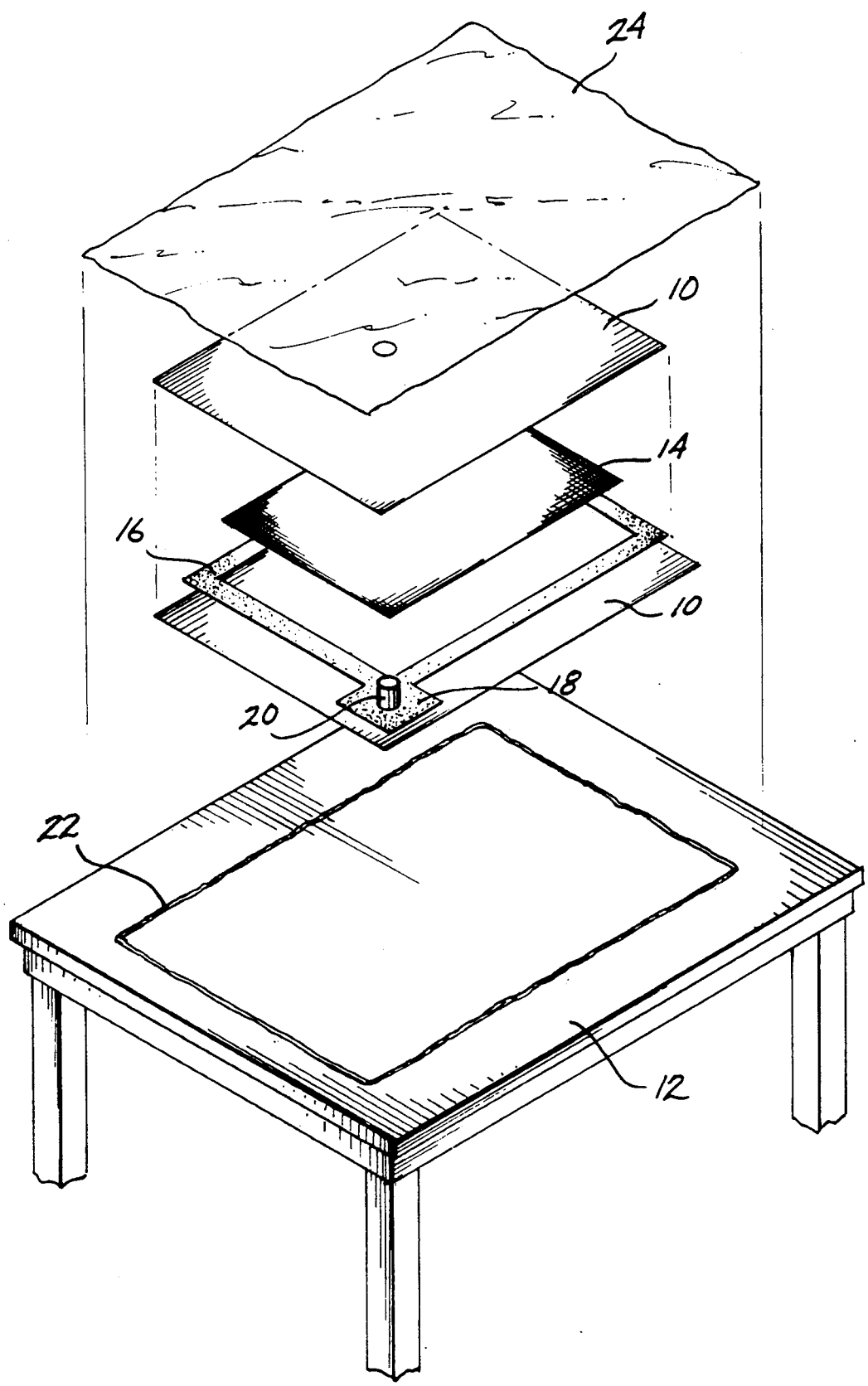
FIG. 4 is an exploded isometric view illustrating the vacuum bagging lay-up used to form resin/ceramic fiber composite test panels.

The ceramic cloth was prepregged using the conventional set-up shown in FIG. 4. A sheet of FEP release film 10 was trimmed to a dimension approximately six inches greater in length and width than the rectangular ceramic fiber cloth to be prepregged. The sheet of FEP release film 10 was laid on a clean table 12 with the fabric 14 centered on top of it. A strip of fibrous breather material 16 was placed around the ceramic fiber rectangle (but not touching it), and additional breather material 18 was positioned on one corner of the release film. A vacuum attachment base plate 20 was then placed in position as shown in the Figure. Bagging sealant 22 was laid around the entire lay-up and nylon bagging film 24 was trimmed to fit over the sealant.

Approximately one-half of the varnish was poured into the center of the fabric 14 and another piece of FEP release film 10 was cut and placed over the fabric and the breather strip. The nylon bagging film 24 was laid over the other materials and a vacuum line and vacuum pump (neither shown) was connected to the vacuum base plate 20 so that a vacuum could be drawn to initiate impregnation of the fabric with the varnish. As a result of the induced wicking action, the resin was absorbed into the fabric of the ceramic fiber cloth. Manually sweeping a plastic scraper (not shown) across the top of the bagging material completed the first sweep of the prepregging process.

After the first sweep, the nylon bagging film 24 and upper sheet of FEP release film 10 were peeled up and the rest of the varnish was poured onto the ceramic fiber cloth. The FEP release film 10 was again laid over the resin and cloth and the vacuum bag 24 was again sealed and the rest of the resin was spread with the plastic scraper in a similar manner to that previously described above. Thereafter, the nylon bagging film 24 was removed and the upper sheet of FEP release film 10 was peeled back. Solvents used in the varnish were allowed to evaporate. The resulting impregnated ceramic cloth was then dried for at least eight hours while protected from deposition of contaminants.

After drying, individual plies of prepregged ceramic cloth were cut to the desired size, using a scalpel, and twenty plies were laid up in flat panels with the ply bias in alternating 0° and 90° dispositions. In the case where the plies are not square, the ply cut-up is planned to result in an equal number of plies with the major dimension in the warp and fill directions of the fabric. The lay-up ensured a quasi-isotropic composite, accounting for strength and modulus differences in the two directions of the cloth weave. The laid-up panels of ceramic cloth were then vacuum bagged and cured, following a generally conventional curing process. Following the curing process, the panels underwent a freestanding post cure at approximately 315° C. for 8 hours in an air circulating oven.

EXAMPLE 2

In addition to the panels made as described above, similar panels comprising a second group were also made following the same process as used in making the panels of the first group in all respects, except that the NEXTEL ceramic fiber cloth was not treated with the hydrolyzed silicate solution or with the coupling agent.

EXAMPLE 3

A third group of panels were made following the same process as used with the first group, except that the hydrolyzed silicate solution was not applied to the NEXTEL fibers. In this third group, the coupling agent was applied prior to prepregging. Both the second and third groups of panels were cured following the same process used for the first group of panels.

Table 1 lists the results of ultimate flexural stress and flexural modulus tests applied to the three groups of panels at: a) room temperature; b) approximately 315° C.; and c) after the panels were aged for 120 hours at 315° C. in air and tested at that temperature. The absolute values for groups 2 and 3 in Table 1 may differ from industrial published data for similar composites due to the varied processing and testing techniques used in the composites industry, and should only be used for comparison with the other data in Table 1.

TABLE 1

| Panel Description | Ultimate Flexural Stress (KSI) | | | Flexural Modulus (MSI) | | |
| --- | --- | --- | --- | --- | --- | --- |
| | Room Temp. | 315° C. | Aged 120 Hr. At 315° C. | Room Temp. | 315° C. | Aged 120 Hr. At 315° C. |
| Group 1 | | | | | | |
| Panels made with ceramic fibers treated with both silicate solution and coupling agent | 44.6 | 28.6 | 25.6 | 4.39 | 4.21 | 3.82 |
| Group 2 | | | | | | |
| Panels made with ceramic fibers treated with neither silicate solution nor coupling agent | 36.1 | 30.8 | 21.5 | 3.81 | 3.87 | 2.75 |
| Group 3 | | | | | | |
| Panels made with ceramic fibers treated only with coupling agent | 35.9 | 26.1 | 18.0 | 3.95 | 3.52 | 3.09 |
| Percent Change (Group 2 to Group 3) | −0.55 | −15.3 | −16.3 | 3.67 | −9.04 | 12.4 |
| Percent Change (Group 2 to Group 1) | 23.5 | −7.14 | 19.1 | 15.2 | 40.0 | 38.9 |

Figure 2:
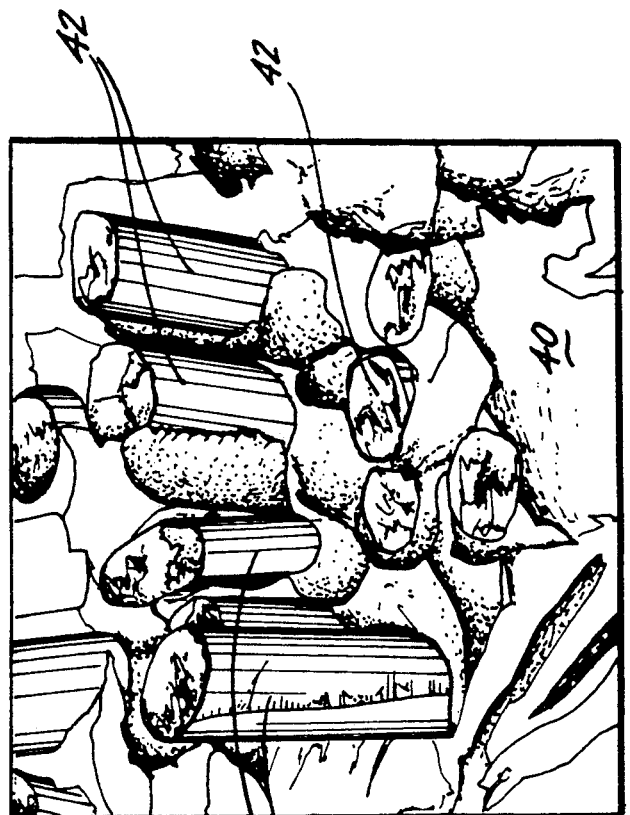
FIG. 2 is drawing of a photomicrograph made at a magnification factor of 700×, showing a flex beam failure in a composite of the present invention.

The improved bonding between the coated ceramic fibers and the polyimide resin in the first group over the uncoated fibers of the second group is apparent from the data in Table 1. The apparent reason for the greater strength of the panels in the first group relative to those in the second group is evident from a comparison of FIGS. 1 and 2. The drawing (FIG. 1) of the failed section of a composite panel from the second group shows voids around each of the NEXTEL fibers, while the drawing (FIG. 2) of a section of a panel from the first group shows the resin firmly bonded to each of the ceramic fibers. Voids around the fibers in the fractured section are substantially eliminated. The improved bonding between the ceramic fibers and the resin illustrated in FIG. 2 is believed responsible for the improvement in the ultimate stress and flexural modulus.

Figure 3:
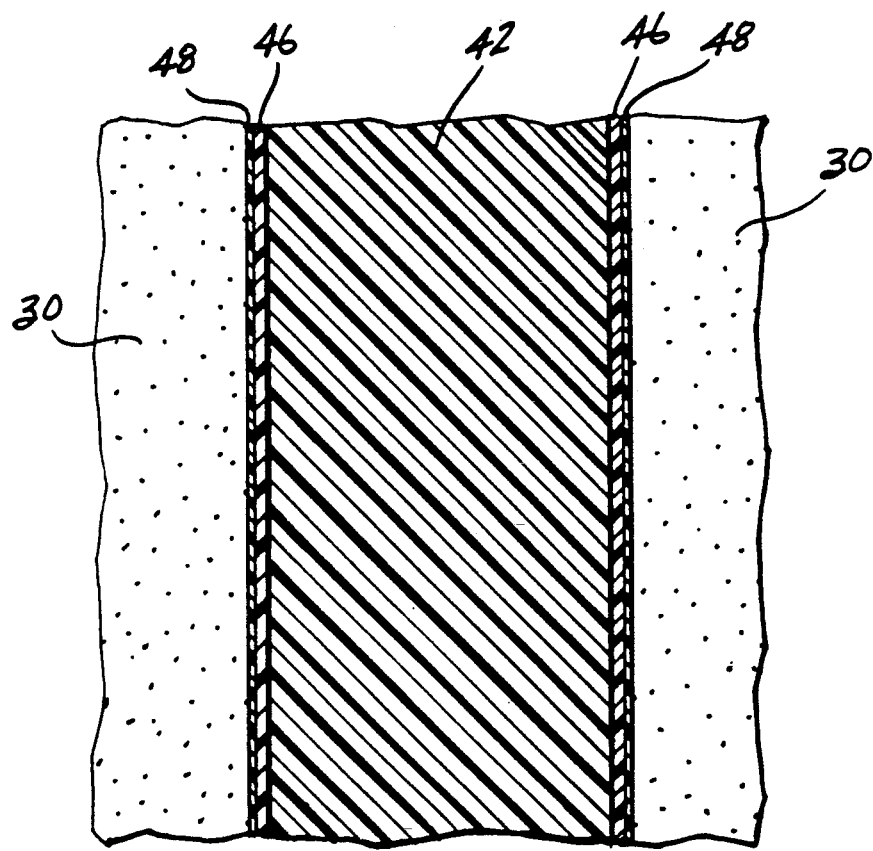
FIG. 3 is a schematic cross section of a portion of a ceramic fiber, showing an amorphous layer of silanol groups and of a coupling agent applied to improve the bonding between a polymeric resin and the ceramic fiber.

Referring now to FIG. 3, a schematic cross section of a portion of one of the ceramic fibers 42 is shown to better explain the bonding between the resin and the ceramic fiber and the basis for the improvement in bonding that results from treating the ceramic fiber with the hydrolyzed silicate solution and coupling agent. As previously explained, for NEXTEL, the heat treatment process substantially eliminates all of the hydroxyl groups normally found on the surface of ceramic fiber 42. These hydroxyl groups are believed to provide binding sites for the coupling agent, which in turn links to the resin. As shown by the relative strength of panels from the second and third groups, the coupling agent alone is ineffective to bond the resin to the ceramic fibers, probably because the uncoated ceramic fibers do not provide sufficient or suitable binding sites for the coupling agent, just as the uncoated fibers provide inadequate binding sites for the resin.

Treatment of ceramic fiber 42 with a hydrated silicate solution, however, forms an amorphous silanol coating 46 on the surface of ceramic fiber 42. This coating may be only in the form of scattered silanol groups (Si—OH) on the surface that provide sites for improved bonding to the coupling agent 48. FIG. 3 schematically illustrates the silanol coating and the thin layer of the coupling agent 48 (A-1100) attached to the surface of the fiber, and does not accurately identify their relative thicknesses. The coupling agent 48 preferably includes an amine that hydrogen bonds to the resin 30, thereby binding the resin to the ceramic fiber 42.

A temperature resistant composite according to the present invention may also be fabricated using ceramic fiber tape or a plurality of chopped ceramic fibers. Application of the hydrolyzed silicate solution and coupling agent to the fibers should provide a similar improvement in bonding the resin to the fibers, regardless of their form.

While NEXTEL fibers are used in the Examples, other ceramic fibers, such as those made from aluminum oxide (sold under the trademark FP-ALUMINA by Dupont Chemical Corporation); silicon carbide; zirconium oxide; or mixtures thereof (all of which lack hydroxyl groups as binding sites) may be coated to improve performance in the method of the present invention. Furthermore, although the Examples all used PMR-15 polyimide, other resins might be similarly chemically bonded to a ceramic substrate, including high-temperature, heterocycle resins, such as polybenzimidazole, polybenzothiazole, and polybenzoxazole, or IP-600 available from National Starch. The coupling agent might also include —OH, —SH, or other hydrogen bonding sites to link the resin and coupling agent. It is believed that the silanol wets the ceramic fiber with an amorphous layer that establishes active —OH sites at the surface. The ceramic-philic portion of this coupling agent is ceramic in nature and forms a ceramic couple with the silanol groups. The resin-philic portion of the coupling agent masks the ceramic nature of the fiber so that the resin substantially wets the coated fiber. Hydrogen bonding sites in the coupling agent strengthen the adherence of the resin to the fiber.

After applying the TEOS layer, it is possible to fire the intermediate product to dry the sol-gel to a zero gel or to form a thin ceramic, rather than simply an amorphous layer. Such firing will generally be made, if at all, at temperatures below about 500° C. to avoid undue loss of rehydratable binding sites. Temperatures up to about 850° C. are possible, but temperatures above 850° C. should be avoided. Drying at ambient temperature actually is preferred, but high temperature firing of the nature just described does not appear to destroy the utility of the TEOS layer. Following firing, however, the resulting layer (which is somewhat deficient in binding sites) should be rehydrated, such as by exposure of the fiber to a humid atmosphere at about 120° F. for several hours before the coupling agent is applied.

The present invention has been disclosed with regard to a preferred embodiment and modifications thereto; however, further modifications will be apparent to those of ordinary skill in the art within the scope of the claims that follow. It is not intended that the invention be limited by the disclosure of the preferred embodiment, but instead that its scope be determined entirely by reference to the claims. The claims should be interpreted liberally to protect the invention that is described, and should only be limited as is necessary in view of the pertinent prior art.

The embodiments of the invention in which an exclusive property or privilege is claimed are defined as follows:

1. A ceramic fiber reinforced organic resin composite comprising: silanol-coated ceramic fibers, a coupling agent bound to the silanol-coating, and an organic resin bound to the coupling agent.

2. The composite of claim 1 wherein the organic resin comprises a resin selected from the group consisting of: imide, oxazole, thiazole, imidazole, and mixtures thereof.

3. A ceramic fiber reinforced organic resin composite comprising: silanol-coated ceramic fibers, a coupling agent bound to the silanol coating, and an organic resin bound to the coupling agent, wherein said organic resin is selected from the group consisting of polybenzimidazole, polybenzothiazole, polybenzoxazole, polyimide, and mixtures thereof.

4. The composite of claim 3 wherein the ceramic fibers are selected from the group consisting of aluminoborosilicate, alumina, silicon carbide, zirconium oxide, or mixtures thereof.

5. The composite of claim 3 wherein the silanol groups are applied to the ceramic fibers as a solution of hydrated alkylsilicate.

6. The composite of claim 5 wherein the silanol-coating comprises an amorphous layer.

7. The composite of claim 3 wherein the coating is fired to about 500° C. prior to adding the coupling agent and is rehydrated.

8. The composite of claim 3 wherein the coupling agent comprises a difunctional molecule, having a ceramic-philic end and a resin-philic end.

9. The composite of claim 3 wherein the coupling agent comprises an aminoalkylsilane.

10. The composite of claim 9 wherein the aminoalkylsilane comprises γ-aminopropyltriethoxysilane.

11. A ceramic fiber reinforced organic resin composite comprising: silanol-coated ceramic fibers, a coupling agent bound to the silanol coating, and an organic resin bound to the coupling agent, wherein said ceramic fibers are aluminoborosilicate fibers, said silanol coating is tetraethyl-o-silicate, said coupling agent is an aminoalkylsilane and said organic resin is a polyimide resin.

12. A ceramic reinforced organic resin composite having a high flexural modulus, comprising:
a ceramic reinforcement, a coating on the reinforcement for providing binding sites on a surface of the ceramic, a coupling agent bound to the binding sites for providing resin couples, and an organic resin bound to the resin couples of the coupling agent, wherein said organic resin is selected from the group consisting of polybenzimidazole, polybenzothiazole, polybenzoxazole, polyimide, and mixtures thereof, wherein the binding sites are Si—OH groups.

13. The composite of claim 12 wherein the coupling agent comprises a difunctional organic molecule having a structure which includes a silanol binding site and a resin couple.

14. The composite of claim 12 wherein the coating is an amorphous layer.

15. The composite of claim 12 wherein the coating is a cohydrated silanol ceramic layer.

16. The composite of claim 12 wherein the coating is applied as a sol-gel.

17. The composite of claim 12 wherein the coating comprises alkylsilicate.

18. A composite having a high flexural modulus, comprising:
a ceramic reinforcement, a coating on the reinforcement for providing binding sites on a surface of the ceramic, a coupling agent bound to the binding sites for providing resin couples, and an organic resin bound to the resin couples of the coupling agent, wherein the binding sites are Si—OH groups.

19. The composite of claim 18 wherein the resin couples include hydrogen bonding sites for binding the resin to the coupling agent.

20. The composite of claim 12 wherein the organic resin comprises a resin selected from the group consisting of: imide, oxazole, thiazole, imidazole, and mixtures thereof.

21. A ceramic substrate reinforced organic resin, comprising:
a ceramic substrate;
a silanol coating on the surface of said ceramic substrate;
a difunctional coupling agent comprising first and second binding sites, wherein the first binding site is bound to said silanol coating; and,
an organic resin bound to the second binding site of said coupling agent by hydrogen bonding.

22. A ceramic substrate reinforced organic resin according to claim 21, wherein said ceramic substrate is in a form selected from the group consisting of chopped fibers, whiskers, woven cloth, tape, and continuous fibers.

* * * * *

UNITED STATES PATENT AND TRADEMARK OFFICE
CERTIFICATE OF CORRECTION

PATENT NO.  : 5,124,374
DATED       : June 23, 1992
INVENTOR(S) : A.L. Baker et al.

It is certified that error appears in the above-identified patent and that said Letters Patent is hereby corrected as shown below:

| COLUMN | LINE | |
|---|---|---|
| 1  | 14 | "ration" should read --ratio-- |
| 2  | 14 | "according" should read --accordingly-- |
| 2  | 25 | "reforced" should read --reinforced-- |
| 2  | 46 | after "is" insert --a-- |
| 8  | 40 | "Claim 3" should read --Claim 5-- |
| 10 | 4  | "Claim 12" should read --Claim 18-- |

Signed and Sealed this

Tenth Day of August, 1993

Attest:

MICHAEL K. KIRK

Attesting Officer     Acting Commissioner of Patents and Trademarks